Jan. 5, 1926.
E. M. EVLETH
TORCH
Filed August 24, 1922
1,568,726
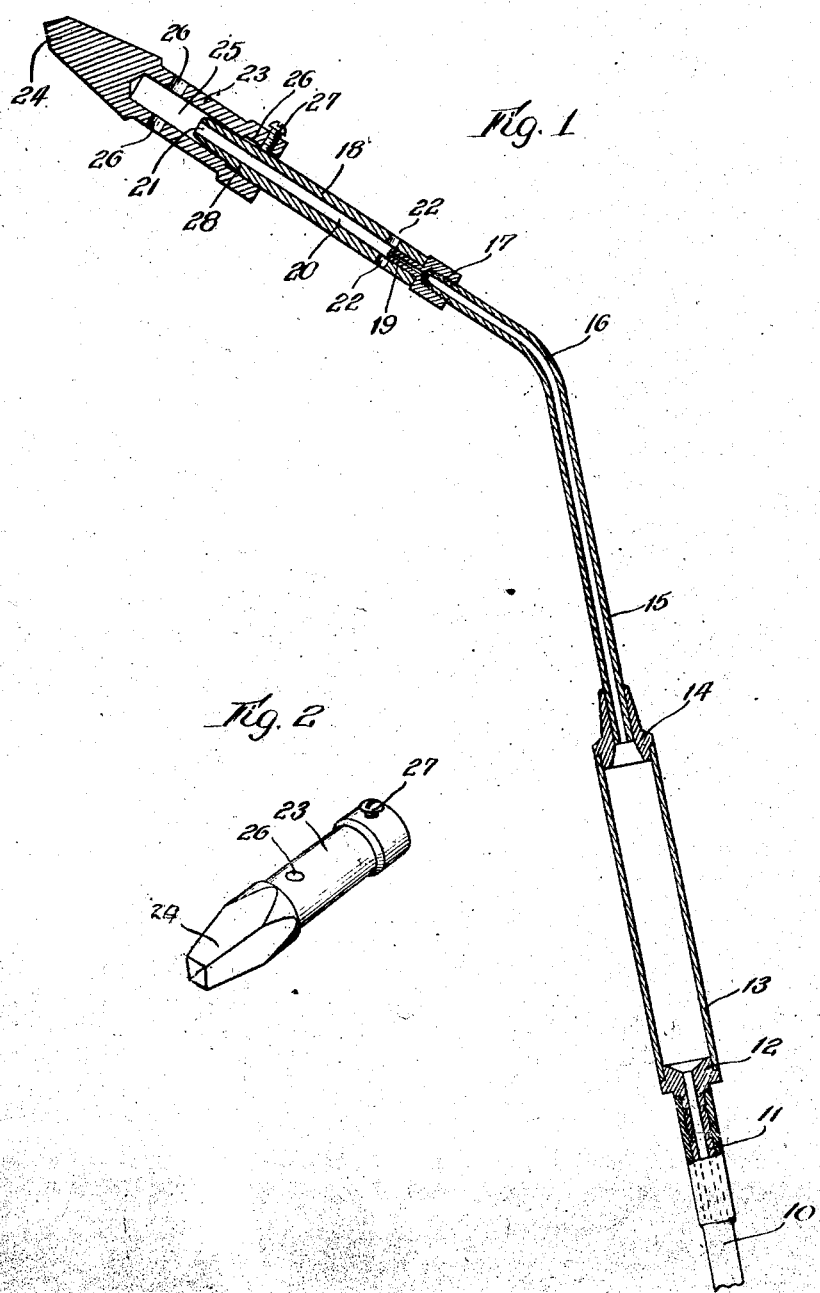
Inventor:
Earl M. Evleth
By: Wm O Belt
Atty.

Patented Jan. 5, 1926.

1,568,726

UNITED STATES PATENT OFFICE.

EARL M. EVLETH, OF ST. PAUL, MINNESOTA, ASSIGNOR TO ST. PAUL WELDING & MANUFACTURING COMPANY, OF ST. PAUL, MINNESOTA, A CORPORATION OF MINNESOTA.

TORCH.

Application filed August 24, 1922. Serial No. 584,005.

*To all whom it may concern:*

Be it known that I, EARL M. EVLETH, a citizen of the United States, residing at St. Paul, in the county of Ramsey and State of Minnesota, have invented certain new and useful Improvements in Torches, of which the following is a specification.

The primary object of this invention is to provide a light, handy torch that will quickly deliver a jet at high heat suitable for a great variety of small work and that will be free from the most serious objections to the ordinary gasoline torch.

A further object of the invention is to provide a torch that will serve both as a handle and as a heater for tools such as soldering irons and will quickly bring them to and maintain them at the desired working temperature.

A further object of the invention is to provide a soldering iron or tool that can be easily and quickly attached to a torch and will enclose the flame so as to efficiently utilize the heat developed by the combustion.

Further objects of the invention will become apparent as the description is read in connection with the accompanying drawing, and in which Fig. 1 is a longitudinal section of a torch embodying the invention equipped with a soldering copper; and Fig. 2 is a perspective view of the soldering copper.

Referring to the reference numerals on the drawing, 10 indicates a piece of rubber or other flexible tubing adapted to be connected at one end to a source of gaseous fuel, such as acetylene, and at the other end to a nipple 11 projecting from a torch. The nipple is here shown integral with a head 12 which telescopes with one end of a relatively large tube 13 which serves as a collecting chamber and as a handle. The other end of this tube telescopes with a somewhat similar nipple 14 secured to a piece of tubing 15 which is preferably bent as indicated at 16 to locate the jet in a convenient relation to the handle 13. The end of this tube is threaded at 17 to receive a suitable tip 18. I prefer to supply a number of different kinds of tips assorted to suit a variety of work. The tip illustrated includes a nozzle 19 which communicates with a relatively large passage 20 leading to a discharge 21. Adjacent to the end of the nozzle 19 the tip is provided with a plurality of openings 22 through which air is drawn by the force of the gas escaping from the nozzle. This air and the gas are mixed in passing through the tip and emerge from the discharge 21 in suitable condition for quick ignition. The mixture can be varied and regulated by the valve on the acetylene tank, and the torch will produce a very hot jet that may be made to take any particular form desired by varying the shape and dimensions of the tip. For repairing honeycomb radiators and the like a long, thin tip will give the best results, whereas for heating rivets and like work a relatively large tip will be most effective.

This torch can be attached to any suitable source of gaseous fuel, but it is particularly well adapted for use with a small portable tank of acetylene. When equipped with the proper tip and supplied with acetylene of suitable volume, the torch will deliver a jet at high heat quickly and safely.

A further use of the torch is found in equipping it with a soldering iron or a like tool attached to the tip. In the drawings, I have illustrated such a tool at 23 equipped with a suitable point 24 and having a longitudinal bore 25 into which the discharge end of the tip projects. This bore, however, extends a considerable distance beyond the end of the tip and reasonably close to the point of the copper.

This extended part of the bore acts as a combustion chamber for the mixture of gas and air, and therefore the metal adjacent to the point of the tool is best located to efficiently absorb the heat developed by the burning fuel. Suitable passages 26 are cut through the walls of the tool to permit the products of combustion to escape. Preferably these passages are located rearwardly from the front end of the bore so as to compel the gases to move back along the walls of the bore, and thereby remain a comparatively long time in contact with the metal so as to transfer most of the heat to the tool.

The rear end of the soldering copper is counterbored at 26 and provided with a transversely extending set screw 27. The tapered end 28 of the tip 18 fits into the bore and counterbore of the soldering copper and the screw 27 secures it thereto.

By this arrangement a soldering copper or like tool can be located at a proper distance from the end of the tip to receive the full effect of the jet flame whereby it is quickly and efficiently heated. At the same time the torch will serve as a handle for the tool by which it can be very conveniently applied to the work.

I am aware that changes may be made in the form, construction and arrangement of the invention, as set forth in the selected embodiment herein, without departing from the scope or sacrificing any of its material advantages, and I therefore reserve the right to make all such changes as fairly fall within the scope of the following claim.

I claim:

A convertible torch and soldering iron, comprising a tip provided at its rear end with an internal and forwardly directed nozzle, there being air inlet openings in the tip adjacent the discharge of the nozzle, a soldering tool having a longitudinal bore terminating short of the front end of the tool and intersecting the rear end thereof, the rear end of the bore being counterbored, the discharge of the tip being tapered and extending through the counterbore and into snug engagement with the bore of the tool, and a set-screw detachably securing the tool to the tip, the tool having outlet openings located between the discharge end of the tip and the closed end of the bore in the tool.

EARL M. EVLETH.